United States Patent [19]
Maddox

[11] B  3,982,174
[45] Sept. 21, 1976

[54] SWITCHING VOLTAGE REGULATOR WITH LOW RFI NOISE

[75] Inventor: Harry L. Maddox, Reynoldsburg, Ohio

[73] Assignee: Western Electric Company, Inc., New York, N.Y.

[22] Filed: June 2, 1975

[21] Appl. No.: 583,089

[44] Published under the second Trial Voluntary Protest Program on January 27, 1976 as document No. B 583,089.

[52] U.S. Cl. ................................. 323/17; 321/2; 323/22 T; 323/DIG. 1
[51] Int. Cl.² ........................................ G05F 1/56
[58] Field of Search............. 321/2; 323/9, 17, 22 T, 323/DIG. 1; 307/296, 297

[56] References Cited
UNITED STATES PATENTS

| | | | |
|---|---|---|---|
| 3,577,065 | 5/1971 | Putzrath et al. ................ | 323/DIG. 1 |
| 3,641,424 | 2/1972 | Kuykendall ......................... | 323/17 |
| 3,736,495 | 5/1973 | Calkin et al. ................... | 323/DIG. 1 |
| 3,742,330 | 6/1973 | Hodges et al. ................... | 323/DIG. 1 |
| 3,745,444 | 7/1973 | Calkin et al. ..................... | 323/22 T |
| 3,781,642 | 9/1973 | Dutton .......................... | 323/DIG. 1 |

OTHER PUBLICATIONS

*Solid State Design* Apr. 1963, pp. 30–34, "Considerations in the Design of Switching Type Regulator," by R. D. Loucks.

*Primary Examiner*—Gerald Goldberg
*Attorney, Agent, or Firm*—W. G. Dosse; R. P. Miller

[57] ABSTRACT

To convert an unregulated input voltage applied across an input and a reference terminal to a regulated output voltage across a load between the reference and an output terminal, a switching transistor is connected in series with an induction coil between the input and the output terminals. A flyback diode is connected between the reference terminal and the juncture between the transistor and the first coil, and is poled to be reverse biased when the transistor is conductive. The transistor is cyclically (a) switched from full conduction to cutoff to interrupt a current flow between the input and the output terminals and through the coil to induce a voltage across the coil to establish a current flow between the reference and the output terminals and through the diode, (b) switched from cutoff to partial conduction at a controlled rate to reduce the current flow through the diode at a relatively slow, controlled rate, and (c) rapidly switched from partial conduction to full conduction when the current flow through the diode has been reduced to a predetermined value. The gradual reduction of current flow through the diode reduces "snap off" of the diode and minimizes RFI (radio frequency interference) noise generated thereby, and the value of the regulated output voltage is controlled by the duty cycle of the transistor.

12 Claims, 1 Drawing Figure

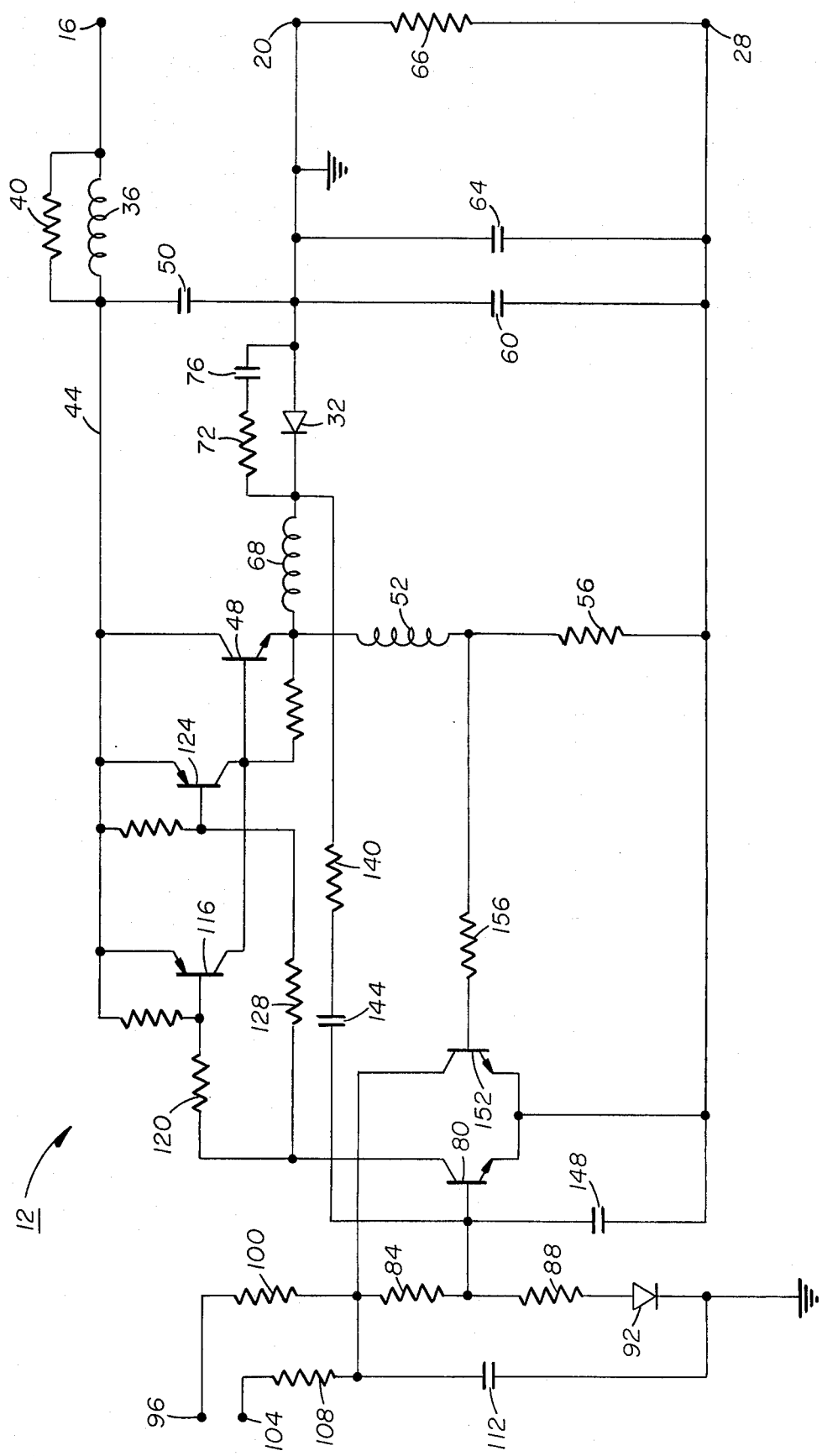

SWITCHING VOLTAGE REGULATOR WITH LOW RFI NOISE

BACKGROUND OF THE INVENTION

1. Field of the Invention

The present invention relates to switching voltage regulators, and in particular to a switching voltage regulator wherein a transistor supplying current to a load is rendered conductive in a selectively controlled manner to minimize RFI (radio frequency interference) noise generated by a flyback diode.

2. Description of the Prior Art

Conventional prior art switching voltage regulators convert an unregulated voltage applied across an input and a reference terminal to a regulated voltage across a load between an output terminal and the reference terminal. In one common type of voltage regulator, a switching transistor is connected in series with an induction coil between the input and the output terminals, and a diode, poled to be nonconductive when the switching transistor is conductive, is connected between the reference terminal and the juncture between the switching transistor and the coil.

In the operation of this type of voltage regulator, the switching transistor is switched between its saturated and its cutoff states in response to variations in the value of the regulated voltage between the output and the reference terminals. More particularly, the transistor is maintained in saturation to reverse bias the diode and to establish a current path between the input and the output terminals, and through the induction coil to establish a magnetic field therewith, until the regulated voltage across the load between the output and the reference terminal increases to a first, or maximum, value. When the regulated voltage reaches the first value, the transistor is rapidly switched from its saturated to its cutoff state. This induces a voltage in the coil, as a result of the interruption of the current flow between the input and the output terminals, which forward biases the diode to establish a current path between the reference and the output terminals and through the diode and the coil. The collapsing field of the coil maintains the current flow between the reference and the output terminals until the regulated voltage across the load decreases to a second, or minimum, value. At this point the transistor is rapidly switched to its saturated state which rapidly reverse biases the diode, and the current path is again established between the input and the output terminals, and through the transistor and the coil, until the regulated voltage across the load again reaches the first value, at which point the described cycle of operation is repeated.

A disadvantage of this type of voltage regulator is that the switching transistor is very rapidly switched from its cutoff to its saturated state, which very rapidly reverse biases the diode. When the diode is very rapidly reverse biased, or "snapped off", wide band RFI noise is generated thereby. As a result of the RFI noise generated by the diode, when this type of conventional regulator is used in, for example, power supplies in mobile radio and microwave transmission equipment, on which rigid frequency limitations are imposed, extensive RFI shielding must be employed to prevent the transmission of the RFI noise therefrom, which shielding adds substantial cost to the equipment. Also, when the conventional regulator is employed in integrated circuits, the RFI noise generated thereby may interfere with logic functions.

Another disadvantage of this type of switching voltage regulator is that conduction of the switching transistor is controlled by fluctuations in the value of the regulated voltage. Accordingly, ripple exists in the regulated output voltage.

Furthermore, with this type of conventional switching voltage regulator the danger exists, during power turn on or in the event that a short or overload condition develops at the output thereof, that circuit components may be destroyed as a result of large power dissipations caused by excessively large currents conducted by the switching transistor in attempting to bring the voltage across the reference and the output terminals to the first value. For example, if a short develops across the load at the output of the regulator, the switching transistor will not be able, when in its saturated state, to increase the voltage across the output terminals to the first value, and the transistor will continue to conduct heavy currents which could result in the destruction of the transistor or of other components. Similarly, when power is initially applied to the voltage regulator, heavy surge currents demanded by a load (i.e., a capacitive load) could result in stressing of circuit components of the regulator.

SUMMARY OF THE INVENTION

In accordance with the present invention, a switching voltage regulator for receiving an unregulated input voltage across a pair of input terminals thereto and for generating a regulated output voltage across a load between a pair of output terminals thereof, includes an induction coil and a switching device having conductive, partially conductive and fully conductive states, connected in series with the coil between a first one of the input terminals and a first one of the output terminals. Also included is a semiconductor device, connected between a second one of the output terminals and a point between the switching device and the coil to conduct when the switching device is nonconductive and to not conduct when the switching device is conductive. Further included is circuitry for connecting a second one of the input terminals with the second one of the output terminals, as well as circuitry for controlling the state of the switching device to cyclically change the switching device (a) from its fully conductive to its nonconductive state to interrupt a current flow between the first one of the input terminals and the first one of the output terminals and through the coil to induce a voltage in the coil to establish a current path through the coil and them semiconductor device and between the pair of output terminals, (b) from its nonconductive state to its partially conductive state at a controlled rate to reduce the current flow through the semiconductor device at a controlled rate, and (c) from its partially conductive state to its fully conductive state at a more rapid rate when the current through the semiconductor device has been reduced to a predetermined value.

More particularly, the switching device is a first transistor, connected with its emitter-collector path in series with the coil between the first input terminal and the first output terminal, and the semiconductor device is a diode, connected between the second input terminal and a point between the first transistor and the coil, and poled to be nonconductive when the transistor is conductive. The state of conduction of the first transistor is determined by circuitry for generating and applying a control signal to the base thereof, which circuitry includes a second transistor, connected with its emitter-collector between a source of voltage and the base of the first transistor, for generating and applying a control signal, upon conduction thereof, to the base of the first transistor, a third transistor, connected with its emitter-collector between the base of the second transistor and the first output terminal for sensing the value of the regulated output voltage, for controlling the conduction of the second transistor upon the conduction thereof, and circuitry for applying to the base of the third transistor a voltage having a value sufficient to drive the third transistor into conduction when the regulated output voltage is less than a predetermined value. The circuitry for generating and applying the control signal to the base of the first transistor also includes a resistor and a capacitor, connected in series between the base of the third transistor, and a point between the diode and the first transistor, for coupling to the base of the third transistor a cyclically changing voltage occurring at the point between the diode and the first transistor in response to changes in the state of conduction of the first transistor and the diode.

In another aspect of the invention, circuitry is included for sensing the value of the current flow to the first output terminal and for changing the voltage at the base of the third transistor, when the value of the current flow reaches a predetermined maximum value, to change the value of the control signal at the base of the first transistor to control the conduction of the first transistor to limit the current flow to the first output terminal to the predetermined maximum value.

Other advantages and features of the invention will be apparent upon consideration of the following detailed description when taken in conjunction with the appended drawing.

BRIEF DESCRIPTION OF THE DRAWING

The drawing illustrates, in schematic form, a switching voltage regulator embodying the teachings of the present invention.

DETAILED DESCRIPTION

The drawing illustrates a voltage regulator 12 for converting an unregulated direct current voltage applied across an input terminal 16 and a reference terminal 20 to a regulated direct current voltage between the reference terminal 20 and an output terminal 28. The input terminal 16 and the reference terminal 20 together comprise a pair of input terminals to the regulator 12, and the reference terminal 20 and the output terminal 28 together comprise a pair of output terminals of the regulator 12. Accordingly, in the circuit as shown, the reference terminal 20 is common to both the pair of input terminals and the pair of output terminals. It is understood, however, that in place of the reference terminal 20 a second input terminal, connected with a second output terminal, could be employed. The regulator 12 includes circuitry to limit the maximum current which may be conducted to the output terminal 28, as well as circuitry for controlling the rate at which a flyback diode 32 is biased from its conductive state to its nonconductive state to greatly minimize RFI (radio frequency interference) noise generated by the diode.

More particularly, an unregulated direct current voltage from a source of voltage (not shown) is applied across the input terminal 16 and the reference terminal 20. The reference terminal 20 is connected to a reference potential, such as ground, and in the circuit arrangement shown the voltage applied to the terminal 16 has a potential which is positive with respect to the potential at the reference terminal 20. The voltage at the terminal 16 is applied through an inductor 36 and a resistor 40, and over a conductor 44 to a switching device, such as to the collector of a switching transistor 48. A capacitor 50 is connected between the conductor 44 and the reference terminal 20, and acts as a filter for the unregulated voltage. The inductor 36 limits the inrush current to the capacitor 50 when the unregulated voltage is initially applied across the terminals 16 and 20 and provides some input voltage noise isolation, and the resistor 40 damps the inductor 36.

The transistor 48 is connected in series at its emitter-collector circuit with an induction coil 52 and a resistor 56 between the conductor 44 and the output terminal 28, and is selectively and intermittently rendered conductive to establish, when conductive, a current path between the input terminal 16 and the output terminal 28 through the coil 52 and the resistor 56. An output capacitor 60 is connected between the reference terminal 20 and the output terminal 28, and conduction of the transistor 48 applies current from the terminal 16 to the plate of the capacitor connected to the output terminal 28 to increase the voltage across the capacitor 60 toward the potential of the unregulated input voltage. A capacitor 64, which has a minimal capacitance value with respect to the capacitance value of the capacitor 60, is connected between the reference terminal 20 and the output terminal 28 to improve high frequency filtering at the output of the circuit, and in the use of the regulator 12 an external load, which may be represented by a resistor 66, is connected between the terminals 20 and 28 for receiving thereacross the voltage across the capacitor 60.

The flyback diode 32 is connected in series with an induction coil 68 between the reference terminal 20 and a point between the switching transistor 48 and the induction coil 52, and is poled to be nonconductive when the transistor 48 is conductive. That is, as shown, the cathode of the diode 32 is toward the emitter of the transistor 48, and the anode of the diode is toward the reference terminal 20. When the transistor 48 is fully conductive, the diode 32 is reverse biased and a current path is established between the input terminal 16 and the output terminal 28, and through the coil 52 and the resistor 56, to charge the capacitor 60. The transistor 48 conducts current to the output terminal 28 for a time determined by circuitry for detecting and controlling the voltage between the output terminals 20 and 28, which circuitry will later be described, whereafter the transistor 48 is rendered nonconductive. When the transistor 48 becomes nonconductive, the current flow between the terminals 16 and 28 and through the coil 52 is interrupted, and the collapsing field of the coil 52 induces a voltage thereacross of a polarity which establishes a current path between the terminals 20 and 28 through the now forward biased flyback diode 32, the coils 52 and 68, and the resistor 56, to continue to apply current to the output terminal 28. The transistor 48 is maintained nonconductive for a time determined by the circuitry for detecting and controlling the output voltage, whereafter the transistor 48 is rendered conductive at a relatively slow, controlled rate to re-establish the current path between the input terminal 16 and the output terminal 28, and to decrease the current through the diode 32 to a predetermined value at a relatively slow, controlled rate, to minimize RFI noise generated thereby. When the current through the diode 32 has been reduced to the predetermined value, and in the present circuit when the current through the diode has been reduced to essentially zero, the transistor 48 is rapidly driven to its fully conductive state. To reduce the spectrum and duration of ringing in the parasitic LC tank of the diode 32, a damping network, consisting of a series connected resistor 72 and capacitor 76, may be connected across the diode 32.

The circuitry for detecting and controlling the voltage across the output terminals 20 and 28 includes a transistor 80 which receives at its base a steady state voltage the value of which, as will be seen, determines the value of the voltage across the terminals 20 and 28. The base of the transistor 80 receives the voltage from the juncture between a pair of resistors 84 and 88, which are connected in series as a voltage divider and through a diode 92 to ground potential. A control input 96 is connected through a resistor 100 to the resistor 84, and a control input 104 is connected through a resistor 108 to the resistor 84. The value of the steady state voltage at the base of the transistor 80 is determined by the value of a voltage applied to the control input 96 and the values of the resistors 84, 88 and 100, or by the value of a voltage applied to a control input 104 and the values of the resistors 84, 88 and 108. Two control inputs 96 and 104 have been shown for the purpose of illustrating one means of applying one of two steady state voltages at the base of the transistor 80 where a constant value voltage is applied to either the control input 96 or the control input 104, and where the resistors 100 and 108 are of differing values. It is understood, however, that a single control input, such as the control input 96, could be employed, and that the value of the voltage applied thereto could be varied to obtain differing values of a voltage at the base of the transistor 80. A capacitor 112 is connected across the resistors 84 and 88 and the diode 92, to filter the voltage applied to the control inputs 96 and 104 and to limit the maximum rate of change of the voltage at the base of the transistor 80.

The emitter of the transistor 80 is connected to the output terminal 28, so that the voltage thereat is equal to the voltage at the terminal 28. The collector of the transistor 80 is connected both to the base of a transistor 116 through a resistor 120, and to the base of a transistor 124 through a resistor 128, to drive the transistors 116 and 124 to a state of conduction determined by the state of conduction of the transistor 80. The transistors 116 and 124 are parallel amplifiers, each of which is connected at its emitter to the input voltage on the conductor 44 and at its collector to the base of the switching transistor 48. Together the transistors 116 and 124 form a single amplifier for applying to the transistor 48 a base drive which has a value determined by the state of conduction of the transistors 116 and 124, and which may be regarded as aa control signal for selectively controlling the state of conduction of the transistor 48. Since the state of conduction of the transistor 80 controls the state of conduction of the transistors 116 and 124, which in turn control the state of conduction of the transistor 48, the state of conduction of the transistor 80 controls the state of conduction of the transistor 48. The base of the transistor 80 is also connected to the cathode of the diode 32 through a resistor 140 and a capacitor 144, as well as to its emitter through a capacitor 148.

As previously stated, the value of the steady state voltage at the base of the transistor 80 determines the value of the regulated voltage across the output terminals 20 and 28. More particularly, the value of the voltage across the output terminals is essentially equal to the value of the voltage at the base of the transistor 80 less the base-emitter voltage drop thereof, since whenever the voltage at the emitter of the transistor 80 is less than the voltage at the base thereof the transistor becomes conductive to drive the transistor 48 into conduction to increase the voltage at the output terminal 28, and whenever the voltage at the emitter of the transistor 80 is greater than the voltage at the base thereof the transistor 80 remains nonconductive to maintain the transistor 48 nonconductive to decrease the voltage at the output terminal 28. The value of the voltage at the base of the transistor 80 is, as stated, essentially determined by the value of a voltage at the control input 96 or 104, and therefore the value of a voltage at the control input 95 or 104 determines the value of the regulated output voltage of the regulator 12.

In the operation of the voltage regulator circuit 12, a voltage applied at one of the control inputs 96 or 104 generates a steady state voltage at the base of the transistor 80, which determines the value of the regulated voltage across the output terminals 20 and 28, or at the terminal 28. To maintain the regulated voltage across the output terminals, without continuously driving the transistors 48 and 80 in a partially conducting state which could result in excessive power dissipation thereby, a cyclically varying voltage is impressed upon the steady state voltage at the base of the transistor 80, through the resistor 140 and the capacitor 144, to cyclically change, or vary, the voltage thereat to cyclically drive the transistor 80, and therefore the transistor 48, into conduction for periods of time as required to maintain the regulated voltage at the terminal 28.

More particularly, assume the circuit 12 is at a point in its operation where the collapsing field of the coil 52 has established a current path between the terminals 20 and 28 and through the diode 32, and where the transistor 80 is nonconductive but is about to begin conducting. At this point, the diode 32 is conducting all of the current supplied to the output terminal 28. As will be later described in greater detail, the transistor 80 is driven to conduction at a relatively slow, controlled rate, as determined by the time constant of the capacitor 144 and the resistors 84, 88 and 140, to generate at the base of the transistor 48 a control signal which drives the transistor 48 into conduction at a relatively slow, controlled rate. When the transistor 48 begins to conduct, it supplies current from the input terminal 16 to the output terminal 28, which current was previously supplied through the diode 32, and as the transistor 48 becomes increasingly conductive at a relatively slow, controlled rate, the current flow through the diode 32 decreases at a relatively slow, controlled rate. By reducing the forward current through the diode 32 at a relatively slow, controlled rate, "snap off" of the diode is prevented and RFI noise generation thereby is minimized. While the diode 32 is being reverse biased, the coil 68 isolates any RFI noise generated by the diode 32 to prevent the transmission thereof to the output terminal, and the capacitor 148 filters any RFI noise in the signal at the base of the transistor 80.

When the current through the flyback diode 32 is reduced to a predetermined value, and in the circuit as shown when the diode 32 ceases to conduct current, the current from the emitter of the partially conducting transistor 48 is applied through the inductor 68 and the resistor 140 to one plate of the capacitor 144. This generates on that plate of the capacitor 144 a rapidly increasing voltage which is coupled to the other plate thereof and applied to the base of the transistor 80 to rapidly drive the transistor 80 to a greater state of conduction. The increased conduction of the transistor 80 rapidly drives the transistors 116 and 124 to a greater state of conduction, which together apply a control signal to the base of the transistor 48 to rapidly drive, or to switch, the transistor 48 to its fully conductive state. The transistor 48 then supplies all of the current to the output terminal 28.

The duty cycle, or time for which the transistor 80 is in its state of greater conduction, and therefore the time that the transistor 48 is in its fully conductive state, is determined by the current supplied to the terminal 28. During the time that the transistor 48 is fully conductive, the voltage at the emitter of the transistor 80 finitely increases as the voltage across the output capacitor 60 increases. Simultaneously, the voltage at the base of the transistor 80 decreases as the capacitor 144, which received a charge when the diode 32 ceased to conduct current, discharges through the resistors 84, 88 and 140. When the capacitor 144 discharges sufficiently to decrease the base drive to the transistor 80 to a point whereat the transistor 80 begins to become less conductive, the base drive to the transistor 48 decreases and the transistor 48 becomes less conductive to begin to interrupt the current flow between the terminals 16 and 28 and through the coil 52 to induce a voltage thereacross. As a result of the voltage induced across the coil 52, the voltage at the cathode of the diode 32 begins to decrease, which change in voltage is connected through the resistor 140 to the capacitor 144 and is coupled therethrough to the base of the transistor 80 to drive the transistor 80 toward its nonconductive state. When the transistor 80 becomes less conductive, the base drive to the transistors 116 and 124 is decreased which renders the transistors 116 and 124 less conductive, which in turn change the value of the control signal at the base of the transistor 48 in a direction to drive, or switch, the transistor 48 toward its nonconductive, or cutoff state. This causes a greater voltage to be induced across the coil 52, which further decreases the voltage at the cathode of the diode 32. This further decrease in voltage at the cathode of the diode 32 is coupled through the capacitor 144 to the base of the transistor 80 to further decrease the conductivity thereof, resulting in a regenerative and rapid turn off of the transistors 48 and 80.

When the transistor 48 is switched to its nonconductive state, the collapsing field of the coil 52 induces a voltage thereacross which establishes the current path through the flyback diode 32 and between the terminals 20 and 28 to continue to apply current to the output terminal 28. During the time that the transistor 48 is in its cutoff state, the collapsing field of the coil 52 applies current from the reference terminal 20 to the output terminal 28 through the flyback diode 32, and the voltage at the emitter of the transistor 80 finitely decreases. Simultaneously, the voltage at the base of the transistor 80 increases as the capacitor 144, which was discharged when the transistor 48 became nonconductive, charges. When the capacitor 144 charges sufficiently to increase the base drive to the transistor 80 to a point whereat the transistor 80 begins to conduct, the transistor 48 begins to conduct to decrease the current flow through the diode 32. Continued charging of the capacitor 144 results in the conductivity of the transistor 80, and therefore of the transistor 48, increasing at a controlled rate, which in turn reduces the current flow through the diode 32 at a controlled rate. When the current flow through the diode 32 has decreased to the predetermined value, the transistor 48 is rendered fully conductive, and the above described cycle of operation is repeated. It should be noted that while the value of the output voltage at the terminal 28, applied to the emitter of the transistor 80, effects when the transistor 80 is rendered conductive and nonconductive, the time constant of the resistors 84, 88 and 140 and the capacitor 144 primarily determines the frequency at which the transistor 80 is rendered conductive, and the regulated output voltage at the terminal 28 remains, for all practical purposes, at an essentially constant value.

To limit the maximum current which may be conducted by the transistor 48 to the output terminal 28 in the event of a short or overload condition between the reference terminal 20 and the output terminal 28, and to protect the transistor 48 from possible destruction as a result of excessive power dissipation, a transistor 152 is connected at its base, through a resistor 156, to the juncture between the coil 52 and one side of the resistor 56, and is connected at its emitter to the opposite side of the resistor 56. The base-emitter voltage of the transistor 152 is, therefore, equal to the voltage drop across the resistor 56, and since the current conducted by the transistor 48 passes through the resistor 56, the voltage across the resistor 56 is a function of, or is in accordance with, the current conducted by the transistor 48. The value of the resistor 56 is chosen to generate thereacross a voltage which is sufficient to render the transistor 152 conductive when the maximum allowable value of current is conducted by the transistor 48 to the output terminal 28.

The collector of the transistor 152 is connected to the resistor 84 and the capacitor 110 for changing, by the application of a voltage thereto upon conduction of the transistor 152, the voltage at the base of the transistor 80 to control the state of conduction thereof. The arrangement is such that when the maximum allowable current flows through the resistor 56 to render the transistor 152 conductive, the base drive to the transistor 80 is changed to adjust the regulated voltage across the output terminals 20 and 28 to a value whereat the current through the resistor 56 is limited to the maximum allowable value. The transistor 152 is rendered conductive until the current conducted by the transistor 48 through the resistor 56 decreases to less than the maximum allowable value, and is insufficient to generate across the resistor 56 a voltage which renders the transistor 152 conductive.

It is significant to note, once again, the unique conductivity sequence of the switching transistor 48 in generating the regulated voltage between the reference terminals 20 and 28 in a manner which minimizes RFI noise generated by the flyback diode 32. That is, the control signal applied to the base of the transistor 48, by the amplifier circuit which includes the transistors 116 and 128, cyclically (a) drives the transistor 48 from full conduction to cutoff to interrupt the current flow between the terminals 16 and 28 and through the coil 52 to induce a voltage thereacross to establish a current path through the flyback diode 32 and the coil 52, (b) drives the transistor 48 to partial conduction at a controlled rate to reduce the magnitude of the current flow through the diode 32 at a controlled rate, and (c) rapidly drives the transistor 48 to full conduction when the magnitude of the current flow through the diode 32 has been reduced to a predetermined value.

While one particular embodiment of the invention has been described in detail, it is to be understood that various other modifications and embodiments thereof may be devised by one skilled in the art without departing from the spirit and scope of the invention.

What is claimed is:

1. In a switching voltage regulator for receiving an unregulated input voltage across a pair of input terminals thereto and for generating a regulated output voltage across a load between a pair of output terminals thereof:
   an induction coil;
   a switching device, having nonconductive, partially conductive, and fully conductive states, connected in series with the coil between a first one of the input terminals and a first one of the output terminals;
   a semiconductor device, connected between a second one of the output terminals and a point between the switching device and the coil to conduct when the switching device is nonconductive and to not conduct when the switching device is conductive;
   means for connecting a second one of the input terminals with the second one of the output terminals, and
   means for cyclically changing the state of the switching device (a) from its fully conductive to its nonconductive state to interrupt a current flow between a first one of the input terminals and the first one of the output terminals and through the coil to induce a voltage in the coil to establish a current path through the coil and the semiconductive device and between the pair of output terminals, (b) from its nonconductive state to its partially conductive state at a controlled rate to reduce the current flow through the semiconductor device at a controlled rate, and (c) from its partially conductive state to its fully conductive state at a more rapid rate when the current through the semiconductor device has been reduced to a predetermined value, to generate the regulated voltage between the pair of output terminals.

2. In a voltage regulator circuit as set forth in claim 1, wherein:
   the switching device is a transistor, connected at the collector and emitter terminals thereof between the first one of the input terminals and the coil;
   the means for controlling includes means for applying a signal to the base of the transistor for controlling the conductivity thereof, and
   the semiconductor device is a diode, poled to be reverse biased when the transistor is conductive and to be forward biased by the voltage induced in the coil when the transistor is switched to its nonconductive state.

3. In a switching voltage regulator for receiving an unregulated input voltage across first and second input terminals thereto and for generating a regulated output voltage across a load between first and second output terminals thereof:
   an induction coil;
   a first transistor, connected with its emitter-collector path in series with the coil between the first input terminal and the first output terminal;
   a diode, connected between the second output terminal and a point between the first transistor and the coil, and poled to be nonconductive when the transistor is conductive;
   means for connecting the second input terminal to the second output terminal, and
   means for generating and for applying a control signal to the base of the first transistor to cyclically drive the first transistor (a) from full conduction to cutoff to interrupt a current flow between the first input terminal and the first output terminal and through the coil to induce a voltage in the coil of a polarity to establish a current path through the diode and between the first and the second output terminals, (b) from cutoff to partial conduction at a controlled rate to reduce the current flow through the diode at a controlled rate and to re-establish the current flow between the first input terminal and the first output terminal, and (c) from partial conduction to full conduction at a more rapid rate when the current flow through the diode has been reduced to a predetermined value, to generate the regulated voltage between the output terminals.

4. In a switching voltage regulator as set forth in claim 3, wherein the means for generating and applying the control signal includes:
   a second transistor, connected with its emitter-collector between a source of voltage and the base of the first transistor, for generating and applying the control signal, upon conduction thereof, to the base of the first transistor;
   a third transistor, connected with its emitter-collector between the base of the second transistor and the first output terminal for sensing the value of the regulated output voltage, for controlling the conduction of the second transistor upon the conduction thereof;
   means for applying to the base of the third transistor a voltage having a value sufficient to drive the third transistor into conduction when the regulated output voltage is less than a predetermined value, and
   means for cyclically changing the voltage at the base of the third transistor to cyclically change the state of conduction thereof and therefore the state of conduction of the second transistor to generate the control signal at the base of the first transistor.

5. In a switching voltage regulator as set forth in claim 4, wherein the means for cyclically changing the voltage at the base of the third transistor includes circuit means, connected between the base of the third transistor and a point between the diode and the first transistor, for applying to the base of the third transistor the cyclically changing voltage having a value determined by the conductive states of the diode and of the first transistor.

6. In a switching voltage regulator as set forth in claim 5, wherein the circuit means for cyclically changing the voltage at the base of the third transistor includes:
   a first resistor, and a capacitor, connected in series with the first resistor between the base of the third transistor and a point between the diode and the first transistor, for coupling to the base of the third transistor voltage changes occurring at the point between the diode and the first transistor in response to changes in the state of conduction of the first transistor and the diode.

7. In a switching voltage regulator, as set forth in claim 6, further including means for sensing the value of the current flow to the first output terminal and for changing the voltage at the base of the third transistor, when the value of the current flow reaches a predetermined maximum value, to change the value of the control signal to control the conduction of the first transistor to limit the current flow to the first output terminal to the predetermined maximum value.

8. In a switching voltage regulator for receiving an unregulated direct current input voltage between an input terminal and a reference terminal thereof and for generating a regulated direct current output voltage across a load between an output terminal thereof and the reference terminal;
an induction coil;
a first transistor, having a base, a collector and an emitter, connected with its emitter-collector circuit path in series with the coil between the input and the output terminals, with the emitter-collector path between the input terminal and the coil;
a diode, connected between the reference terminal and a point between the series connected first transistor and coil, and poled to be nonconductive when the first transistor is conductive;
means for applying a control signal to the base of the first transistor to cyclically drive the first transistor (a) from full conduction to cutoff to interrupt a current flow between the input and the output terminals and through the first transistor and the coil to induce a voltage in the coil of a polarity to forward bias the diode and establish a current path between the reference terminal and the output terminal and through the diode and the coil (b) from cutoff to partial conduction at a controlled rate to again establish the current path between the input terminal and the output terminal and to reduce the current flow through the diode at a controlled rate, and (c) from partial conduction to full conduction at a more rapid rate when the current flow through the diode has been reduced to a predetermined value, to generate the regulated direct current output voltage across the load between the output terminal and the reference terminal, and
means for sensing the value of the current flow to the output terminal and for varying the value of the control signal, when the current flow reaches a predetermined maximum value, to control the conduction of the first transistor to limit the current flow to the output terminal to the predetermined maximum value.

9. In a switching voltage regulator as set forth in claim 8, wherein the means for controlling the conduction of the first transistor includes:
transistor amplifier means, having an input and an output, for receiving at its input a voltage and for generating at its output the control signal, connected to sense the value of the regulated voltage at the output terminal;
means for connecting the output of the transistor amplifier means to the base of the first transistor to apply the control signal thereto;
means for applying a first voltage to the input of the transistor amplifier means, having a value to generate a signal at the output thereof whenever the value of the sensed regulated voltage exceeds a predetermined value, and
means for impressing a cyclically changing second voltage on the first voltage at the input to the transistor amplifier means to generate the control signal at the output thereof.

10. In a switching voltage regulator as set forth in claim 9, wherein the means for impressing a cyclically changing second voltage on the first voltage includes:
a first resistor, and
a capacitor, connected in series with the first resistor between the input to the transistor amplifier means and a point between the diode and the first transistor, for coupling voltage changes at the point between the diode and the first transistor, in response to changes in the state of conduction thereof, to the input of the first amplifier means, and for impressing the voltage changes on the first voltage thereat.

11. In a switching voltage regulator as set forth in claim 8, wherein the means for sensing the value of the current flow to the output terminal includes:
a second resistor, connected in series with the coil between the coil and the output terminal;
a second transistor, connected to sense the value of the voltage across the second resistor, and thereby the value of the current flow to the output terminal, and to be rendered conductive whenever the voltage exceeds a predetermined maximum value, and
means for connecting the second transistor to the input of the transistor amplifier means to change the value of the voltage thereat to vary the value of the control signal at the output thereof to control the conduction of the first transistor to limit the current flow to the output terminal to the predetermined maximum value.

12. In a voltage regulator circuit for converting an unregulated direct current input voltage applied across a pair of input terminals thereof to a regulated direct current output voltage across a pair of output terminals thereof:
a transistor, having a collector and an emitter forming a circuit path, and having a base;
means connecting one end of the transistor collectoremitter circuit path to a first one of the input terminals;
an induction coil, connected at one end thereof to the other end of the collector-emitter circuit path of the transistor;
means connecting the other end of the induction coil to a first one of the output terminals;
a diode, connected between a second one of the output terminals and a point between the transistor and the induction coil with its cathode toward the transistor and with its anode toward the second one of the output terminals, poled to be nonconductive when the transistor is conductive;
means connecting the second one of the output terminals to a second one of the input terminals, and
means for detecting the value of the output voltage and of the current flow through the diode and for generating and applying a control signal to the base of the transistor to control the conductivity thereof to cyclically drive the transistor (a) to full conduction to establish a current flow between the first input terminal and the first output terminal and through the induction coil, and to reverse bias the diode, (b) from full conduction to cutoff to interrupt the current flow between the first input terminal and the first output terminal, and through the coil, to induce a voltage across the coil of a polarity to forward bias the diode to establish a current flow between the second and the first output terminals, and through the diode and the coil, and (c) from cutoff to partial conduction at a relatively slow, controlled rate to reduce the current flow through the diode at a controlled rate to reduce snap off of the diode until the current flow through the diode has been reduced to a predetermined value, whereupon the transistor is rapidly driven to full conduction, to convert the unregulated direct current input voltage applied across the pair of input terminals to the regulated direct current output voltage across the pair of output terminals.

* * * * *